United States Patent [19]

Adolfsson

[11] Patent Number: 5,054,939
[45] Date of Patent: Oct. 8, 1991

[54] MAGNETIC SLIDING BEARING

[75] Inventor: Rune Adolfsson, Varberg, Sweden

[73] Assignee: SKF Nova AB, Gothenburg, Sweden

[21] Appl. No.: 532,949

[22] Filed: Jun. 4, 1990

[30] Foreign Application Priority Data

Jun. 5, 1989 [SE] Sweden ................................ 8902032

[51] Int. Cl.⁵ ........................ F16C 33/82; F16C 32/06
[52] U.S. Cl. .................................... 384/133; 384/114
[58] Field of Search .............. 384/133, 114, 115, 117, 384/125, 280, 286, 309, 311, 312

[56] References Cited

U.S. PATENT DOCUMENTS 3,421,799 1/1969 Tallian et al. ...................... 384/115
3,439,961 4/1969 Stiles ................................... 384/114

Primary Examiner—Thomas R. Hannon
Attorney, Agent, or Firm—Eugene E. Renz, Jr.

[57] ABSTRACT

A sliding bearing which is mounted on a shaft (2) and is composed by a magnetized material, whereby between the sliding bearing (1) and a surrounding bearing housing (5) is provided a magnetic fluid as lubricating and sealing agent. The sliding bearing (1) has sliding shoes (3) adapted at rotation of the shaft (2) to cause a compression of the fluid volume and to urge fluid to pass out under the sliding shoes at the same time as the hydrostatic pressure increases in the spaces (4) between the sliding shoes (3).

5 Claims, 1 Drawing Sheet

MAGNETIC SLIDING BEARING

FIELD OF THE INVENTION

The present invention relates to a sliding bearing which is mounted on a shaft and is composed by a magnetizable material, whereby between the sliding bearing and a surrounding bearing housing is provided a magnetic fluid as lubricating and sealing agent.

BACKGROUND OF THE INVENTION

Conventional sliding bearings generally have rather short service life due to the wear to which they are subjected, especially at start and stop.

Magnetic sliding bearings in recent times have had an ever increasing importance and are used in many applications, e.g. at disk storage for computers, in domestic machines and in other applications, where it is aimed at silent operation, extended operation life and high rotational accuracy. An important advantage at such bearings is that the lubricant, which contains particles of magnetizable material, is retained in the bearing by means of the magnetic field generated by the magnetic bearing sleeve, whereby leakage of the lubricant is prevented. Such a magnetic fluid, also referred to as "ferrofluid", consists of a colloidal dispersion or suspension of small magnetic particles in a carrier fluid, e.g. oil. The magnetic particles are retained in stable colloidal suspension by means of a dispersant. Such magnetic fluids can be positioned and retained in spaces without use of a container by means of a magnetic field.

SUMMARY OF THE INVENTION

The purpose of the present invention is to provide a sliding bearing of the type initially mentioned, which gives a hydrodynamic as well as a hydrostatic lubrication without use of oil pump or the like and which has a long service life. According to the invention this has been achieved therein that the sliding bearing has sliding shoes adapted at rotation of the shaft to cause a compression of the fluid volume and to urge fluid to pass out under the sliding shoe at the same time as the hydrostatic pressure increases in the spaces between the sliding shoes.

BRIEF DESCRIPTION OF THE DRAWINGS

These and other objects of the present invention and the various features and details of the operation and construction thereof are hereinafter more fully set forth with reference to the accompanying drawings, wherein:

FIG. 3 is a section along line 3—3 in FIG. 1.

DETAILED DESCRIPTION OF THE PREFERRED EMBODIMENT

Figure 1:
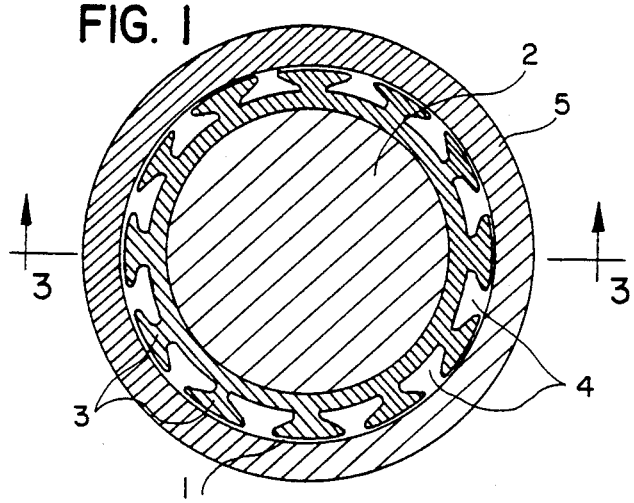
FIG. 1 is a cross section through a sliding bearing according to a first embodiment.

The sliding bearing, which is mounted on a shaft 2 comprises by a sleeve of magnetizable material, e.g. sheet metal or synthetic material in which has been embedded magnetic particles, e.g. magnetite particles.

The sliding bearing 1 has a plurality of sliding shoes 3 distributed about its circumference. The sliding shoes 3 have preferably a certain elasticity. Pockets or chambers 4 are formed between the sliding shoes 3. Between the sliding bearing 1 and the surrounding bearing housing 5 is introduced a lubricant in form of a magnetic fluid, e.g. oil containing small magnetic particles in colloidal suspension.

The main portion of the oil is contained in the chambers 4. However, during rotation of the shaft 2, the oil is compressed, thus that a certain portion of the oil must pass out under the sliding shoes 3 and thereby contribute to the lubrication. The bearing in this manner operates as a hydrodynamic sliding bearing. The resistance against the oil exerted by the preferably elastic sliding shoes 3 provides a static pressure in the chambers 4, which means that the bearing also will operate as a hydrostatic sliding bearing.

Figure 2A:
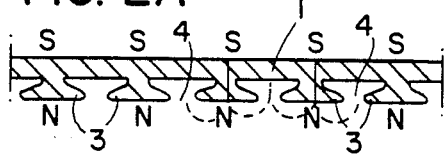
FIG. 2A. is a fragmentary development view schematically illustrating one embodiment of magnetization of the sliding bearing.
Figure 2B:
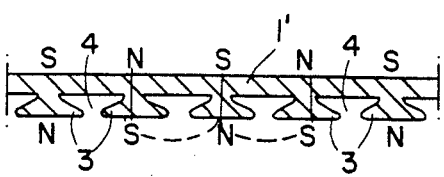
FIG. 2B. is a fragmentary development view, schematically illustrating an alternative embodiment of magnetization of this sliding bearing.
Figure 3:
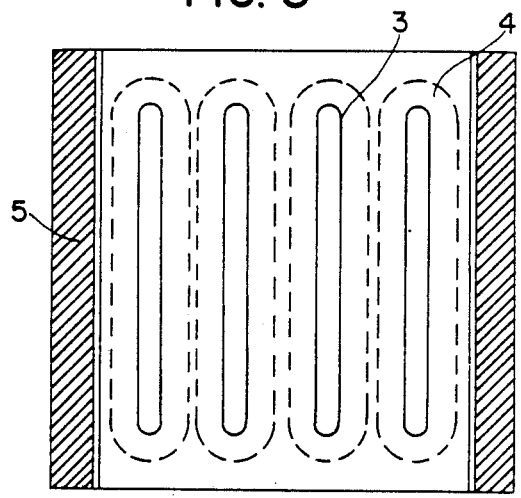
FIG. 3 is a cross section of a alternative embodiment of the sliding bearing.

By magnetizing the sliding bearing in an appropriate manner, it is possible to secure that the chambers 4 are always replenished with oil. The sliding shoes 3 may be line magnetized with a certain polarity, whereas the bottom of the chambers 4 are magnetized with opposed polarity. This provides a radial magnetization of the sliding bearing 1. Another alternative is to magnetize the sliding shoes 3 with alternating polarities, i.e. every second sliding shoe acts as a north-magnetic pole and every second as a south-magnetic pole. These embodiments are shown by the schematic illustrations in FIG. 2A and FIG. 2B, while the relationship of the parts is shown in FIG. 3.

Figure 4:
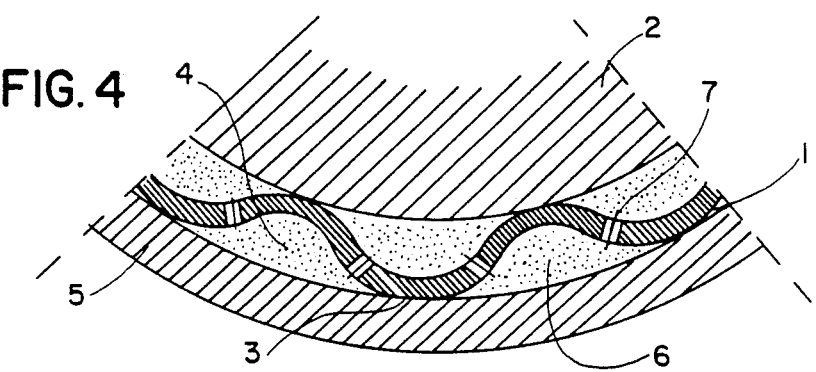
FIG. 4 is a cross section of an alternative embodiment of the sliding bearing.

The sliding bearing 1 shown in FIG. 4 is designed as a corrugated hose, whereby the corrugations act as sliding shoes 3. A plurality of holes 7 are provided in the hose for pressure compensation between the outer and inner sides of the hose.

The material in the sliding bearing is preferably rubber of a polymer material, in which are embedded magnetic particles, e.g. magnetite particles.

The invention is not limited to the embodiments shown and described, but a plurality of modifications are possible within the scope of the claims.

What is claimed is:

1. A sliding bearing which is mounted on a shaft (2) and comprises a magnetized material, whereby between the sliding bearing (1) and a surrounding bearing housing (5) is provided a magnetic fluid as lubricating and sealing agent, characterized therein, that the sliding bearing (1) has sliding shoes (3) adapted at rotation of the shaft (2) to cause a compression of the fluid volume and to urge fluid to pass out under the sliding shoes at the same time as the hydrostatic pressure increases in the spaces (4) between the sliding shoes (3).

2. The sliding bearing as claimed in claim 1, characterized therein, that the sliding shoes (3) are made from elastic material.

3. The sliding bearing as claimed in claim 1, characterized therein, that the sliding bearing (1) is magnetized in such a manner that the spaces or the chambers (4) between the sliding shoes always are replenished with a magnetic fluid.

4. The sliding bearing as claimed in claim 3, characterized therein, that the sliding bearing (1) is magnetized in radial direction thus that the sliding shoes (3) and the bottom of the chambers (4) have opposed polarities.

5. The sliding bearing as claimed in claim 3, characterized therein, that the sliding shoes (3) are magnetized with alternating polarities.

* * * * *